US010861141B2

(12) United States Patent
Wang

(10) Patent No.: US 10,861,141 B2
(45) Date of Patent: Dec. 8, 2020

(54) FACIAL IMAGE-PROCESSING METHOD AND SYSTEM THEREOF

(71) Applicant: National Kaohsiung University of Applied Sciences, Kaohsiung (TW)

(72) Inventor: Jing-Wein Wang, Kaohsiung (TW)

(73) Assignee: NATIONAL KAOHSIUNG UNIVERSITY OF APPLIED SCIENCES, Kaohsiung (TW)

( * ) Notice: Subject to any disclaimer, the term of this patent is extended or adjusted under 35 U.S.C. 154(b) by 502 days.

(21) Appl. No.: 15/462,140

(22) Filed: Mar. 17, 2017

(65) Prior Publication Data

US 2017/0330313 A1    Nov. 16, 2017

(30) Foreign Application Priority Data

May 11, 2016    (TW) .............................. 105114616 A

(51) Int. Cl.
*G06T 5/10*        (2006.01)
*G06K 9/00*        (2006.01)
(Continued)

(52) U.S. Cl.
CPC .............. *G06T 5/10* (2013.01); *G06K 9/00228* (2013.01); *G06K 9/00241* (2013.01);
(Continued)

(58) Field of Classification Search
CPC ............. G06T 5/10; G06T 2207/10024; G06T 2207/30201; G06K 9/00228; G06K 9/00241; G06K 9/4461
See application file for complete search history.

(56) References Cited

U.S. PATENT DOCUMENTS

| 7,620,217 | B2 | 11/2009 | Chen et al. |
| 2006/0034517 | A1* | 2/2006 | Bober ................ G06K 9/00281 |
| | | | 382/190 |

(Continued)

FOREIGN PATENT DOCUMENTS

| TW | 200707310 A | 2/2007 |
| TW | 200915216 A | 4/2009 |
| TW | I344110 B | 6/2011 |

OTHER PUBLICATIONS

J.W. Wang, J.S. Lee, W.Y. Chen; "Face recognition based on projected color space with lighting compensation"; IEEE Signal Process. Lett., 18 (2011), pp. 567-570.*

(Continued)

*Primary Examiner* — Menatoallah Youssef
(74) *Attorney, Agent, or Firm* — Che-Yang Chen; Law Office of Michael Chen

(57) ABSTRACT

A facial image-processing method includes: transforming a facial image with 2D Fourier transformation (FT) in a template to obtain 2D FT data of color channels of the facial image and a 2D FT data of the template, with computing first light intensities of color channels and a second light intensity of the template with the 2D FT data; computing an intensity mean value and an intensity maximum in each of the color channels; processing the first light intensities and the second light intensity with singular value decomposition (SVD) to obtain intensity spectrum SVD matrixes and a template SVD matrix; computing a compensation weight coefficient for each color channel with the intensity mean value, the intensity maximum and SV maximums of the intensity spectrum SVD matrixes and the template SVD matrix; and compensating the facial image with the compensation weight coefficients to obtain a compensated facial image.

10 Claims, 3 Drawing Sheets

(51) Int. Cl.
*G06T 5/00* (2006.01)
*G06T 5/50* (2006.01)
*G06K 9/46* (2006.01)

(52) U.S. Cl.
CPC ............... *G06T 5/009* (2013.01); *G06T 5/50* (2013.01); *G06K 9/4661* (2013.01); *G06T 2207/10024* (2013.01); *G06T 2207/20056* (2013.01); *G06T 2207/30201* (2013.01)

(56) References Cited

U.S. PATENT DOCUMENTS

2007/0065015 A1* 3/2007 Nishiyama ......... G06K 9/00208
382/190
2013/0216129 A1* 8/2013 Wang ................... G06K 9/4652
382/165

OTHER PUBLICATIONS

Z. Liu, C. Liu; "A Hybrid Color and Frequency Features Method for Face Recognition"; IEEE Transactions on Image Processing, vol. 17, Issue 10; Oct. 2008.*

* cited by examiner

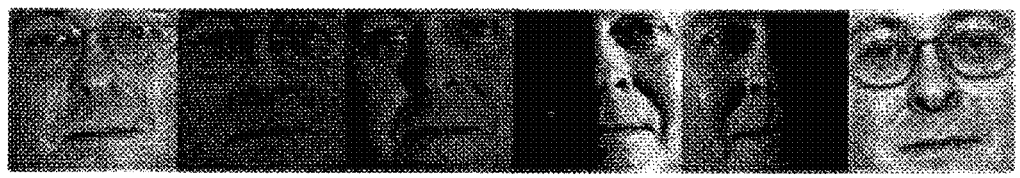
FIG. 3A   FIG. 3B   FIG. 3C   FIG. 3D   FIG. 3E   FIG. 3F
FIG. 4A                         FIG. 4B
FIG. 4C                         FIG. 4D
FIG. 4E                         FIG. 4F
FIG. 5A
FIG. 5B
FIG. 5C
FIG. 5D

FACIAL IMAGE-PROCESSING METHOD AND SYSTEM THEREOF

BACKGROUND OF THE INVENTION

1. Field of the Invention

The present invention relates to a facial image-processing method and system thereof. Particularly, the present invention relates to the facial image-processing method and system thereof for compensating brightness. More particularly, the present invention relates to the facial image-processing method and system thereof for compensating brightness with 2D Fourier transformation and singular value decomposition (SVD).

2. Description of the Related Art

Taiwanese Patent Publication No. 200707310, entitled "Human facial image recognition method based on based on facial features," discloses a facial image recognition method. The facial image recognition method includes: detecting a human face position and a plurality of facial features with a human face detection unit; classifying the facial features into a plurality of facial classifications and defining a facial image sample and a plurality of facial feature samples of the facial features; retrieving a facial image and facial features thereof from an input facial image; and comparing the facial image and the facial features with the facial image sample and a plurality of facial feature samples.

Another Taiwanese Patent Publication No. 200915216, entitled "Human facial feature retrieving method based on adaptive data of Gaussian core matrix," discloses a facial image recognition method. The facial image recognition method includes the steps of: 1. calculating a Gaussian core matrix between an input image X and a database image Y; 2. calculating an error matrix; 3. calculating a plurality of traces of inter-classification divergence matrixes and a plurality of traces of classification divergence matrixes; 4. calculating a minimum range value of adaptive input data with Lagrange method and Lagrange parameters; 5. calculating an optimum augmented coefficient matrix obtained in step 4; 6. substituting the optimum augmented coefficient matrix obtained in step 5 into the Gaussian core matrix to retrieve facial features.

Another Taiwanese Patent Publication No. I318756, entitled "3D human facial image recognition system and method," discloses a 3D facial image recognition system. The 3D facial image recognition system includes a first data storage module, an input unit, a signal conversion module, a second data storage unit, a micro-processor module, a matching module and an output unit.

Another Taiwanese Patent Publication No. I344110, entitled. "2D human facial feature retrieving method with combining projection with principal component analysis," discloses a facial image recognition method. The facial image recognition method includes the steps of: 1. providing a projection combined image; 2. calculating 2D principal component analysis; 3. building an assembled matrix distance classifier with nearest neighbor algorithm. After calculating assembled matrix distances of all measured feature matrixes, a minimum value as nearest neighbor is obtained.

However, there is a need of improving and simplifying a conventional human facial feature retrieving method and system. The above-mentioned patents and patent publications are incorporated herein by reference for purposes including, but not limited to, indicating the background of the present invention and illustrating the situation of the art.

As is described in greater detail below, the present invention provides a facial image-processing method and system thereof. A facial image is transformed with 2D Fourier transformation (FT) in a template to obtain a plurality of 2D FT data of color channels of the facial image and a 2D FT data of the template. First light intensities of color channels and a second light intensity of the template are computed. An intensity mean value and an intensity maximum in each color channel are computed. The first light intensities and the second light intensity are processed with singular value decomposition (SVD) to obtain a plurality of intensity spectrum SVD matrixes and a template SVD matrix. A compensation weight coefficient for each color channel is computed with the intensity mean value, the intensity maximum and SV maximums of the intensity spectrum SVD matrixes and the template SVD matrix. The facial image is compensated by the compensation weight coefficients in such a way as to mitigate and overcome the above problem.

SUMMARY OF THE INVENTION

The primary objective of this invention is to provide a facial image-processing method and system thereof. A facial image is transformed with 2D Fourier transformation (FT) in a template to obtain a plurality of 2D FT data of color channels of the facial image and a 2D FT data of the template. First light intensities of color channels and a second light intensity of the template are computed. An intensity mean value and an intensity maximum in each color channel are computed. The first light intensities and the second light intensity are processed with singular value decomposition (SVD) to obtain a plurality of intensity spectrum SVD matrixes and a template SVD matrix. A compensation weight coefficient for each color channel is computed with the intensity mean value, the intensity maximum and SV maximums of the intensity spectrum SVD matrixes and the template SVD matrix, is applied to compensate the facial image. Advantageously, the facial image-processing method and system of the present invention is successful in enhancing the reliability of facial recognition.

The facial image-processing method in accordance with an aspect of the present invention includes:

transforming a facial image with 2D Fourier transformation (FT) in a template to obtain a plurality of 2D FT data of color channels of the facial image and a 2D FT data of the template, with computing a plurality of first light intensities of color channels and a second light intensity of the template with the 2D FT data;

computing an intensity mean value and an intensity maximum in each of the color channels;

processing the first light intensities and the second light intensity with singular value decomposition (SVD) to obtain a plurality of intensity spectrum SVD matrixes and a template SVD matrix;

computing a compensation weight coefficient for each color channel with the intensity mean value, the intensity maximum and SV maximums of the intensity spectrum SVD matrixes and the template SVD matrix; and compensating the facial image with the compensation weight coefficients to obtain a compensated facial image.

The facial image-processing method in accordance with another aspect of the present invention includes:

transforming a facial image with 2D Fourier transformation (FT) in a template to obtain a plurality of 2D FT data of color channels of the facial image and a 2D FT data of the template, with computing a plurality of first light phases of color channels and a second light phase of the template with the 2D FT data;

computing a phase mean value and a phase maximum in each of the color channels;

processing the first light phases and the second light phase with singular value decomposition (SVD) to obtain a plurality of phase spectrum SVD matrixes and a template SVD matrix;

computing a compensation weight coefficient for each color channel with the phase mean value, the phase maximum and SV maximums of the phase spectrum SVD matrixes and the template SVD matrix; and compensating the facial image with the compensation weight coefficients to obtain a compensated facial image.

In a separate aspect of the present invention, the template is selected from a Gaussian template.

In a further separate aspect of the present invention, the facial image is at least one or a plurality of facial feature image pieces which are combined to form a combined facial image.

In yet a further separate aspect of the present invention, the color channels include a R color channel, a G color channel and a B color channel.

In yet a further separate aspect of the present invention, the compensation weight coefficient is calculated with a ratio of the SV maximum of the template SVD matrix to that of the intensity spectrum SVD matrix or a ratio of the SV maximum of the template SVD matrix to that of the phase spectrum SVD matrix.

The facial image-processing system in accordance with an aspect of the present invention includes:

an image input unit provided to input a facial image;

an image processing unit connecting with the image input unit, with transforming the facial image with 2D Fourier transformation in a template to obtain a plurality of 2D FT data of color channels of the facial image and a 2D FT data of the template, with computing a plurality of first light intensities (or phases) of color channels and a second light intensity (or phase) of the template with the 2D FT data, with computing an intensity (or phase) mean value and an intensity (or phase) maximum in each color channel, with processing the first light intensities (or phases) and the second light intensity (or phase) with singular value decomposition (SVD) to obtain a plurality of intensity (or phase)spectrum SVD matrixes and a template SVD matrix, with computing a compensation weight coefficient for each color channel with the intensity (or phase) mean value, the intensity (or phase) maximum and SV maximums of the intensity spectrum SVD matrixes and the template SVD matrix, with compensating the facial image with the compensation weight coefficients to obtain a compensated facial image; and a facial recognition unit connecting with the image processing unit for recognizing the compensated facial image.

In a separate aspect of the present invention, an output unit connects with the facial recognition unit to output a recognition result data.

In a further separate aspect of the present invention, the image input unit is an image-capturing unit.

In yet a further separate aspect of the present invention, the template is selected from a Gaussian template.

In yet a further separate aspect of the present invention, the facial image is at least one or a plurality of facial feature image pieces which are combined to form a combined facial image.

In yet a further separate aspect of the present invention, the color channels include a R color channel, a G color channel and a B color channel.

In yet a further separate aspect of the present invention, the compensation weight coefficient is calculated with a ratio of the SV maximum of the template SVD matrix to that of the intensity spectrum SVD matrix by the image processing unit or a ratio of the SV maximum of the template SVD matrix to that of the phase spectrum SVD matrix by the image processing unit.

In yet a further separate aspect of the present invention, the facial image is a color facial image or a set of color facial image pieces.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3A-3F are a series of facial images with various illumination modules collected from the CMU-PIE database for processing in the facial image-processing system in accordance with the preferred embodiment of the present invention.

FIG. 4A is an original, processed facial image and a distribution chart of three color channels thereof applied in the facial image-processing system in accordance with the preferred embodiment of the present invention.

FIGS. 4B-4F are five series of processed facial images and distribution charts of three color channels thereof individually processed by various facial image-processing methods.

FIG. 5A is a series of original, facial images with various lateral illumination applied in the facial image-processing system in accordance with the preferred embodiment of the present invention.

FIGS. 5B-5D are three series of processed facial images processed by the facial image-processing system in accordance with the preferred embodiment of the present invention.

DETAILED DESCRIPTION OF THE INVENTION

It is noted that a facial image-processing method and system thereof in accordance with the present invention can be applicable for various facial image recognition devices and related devices, including computer systems, electric appliance control systems, automatic control systems, home care systems, medical appliance automatic control systems or security systems, for example, which are not limitative of the present invention.

Figure 1:
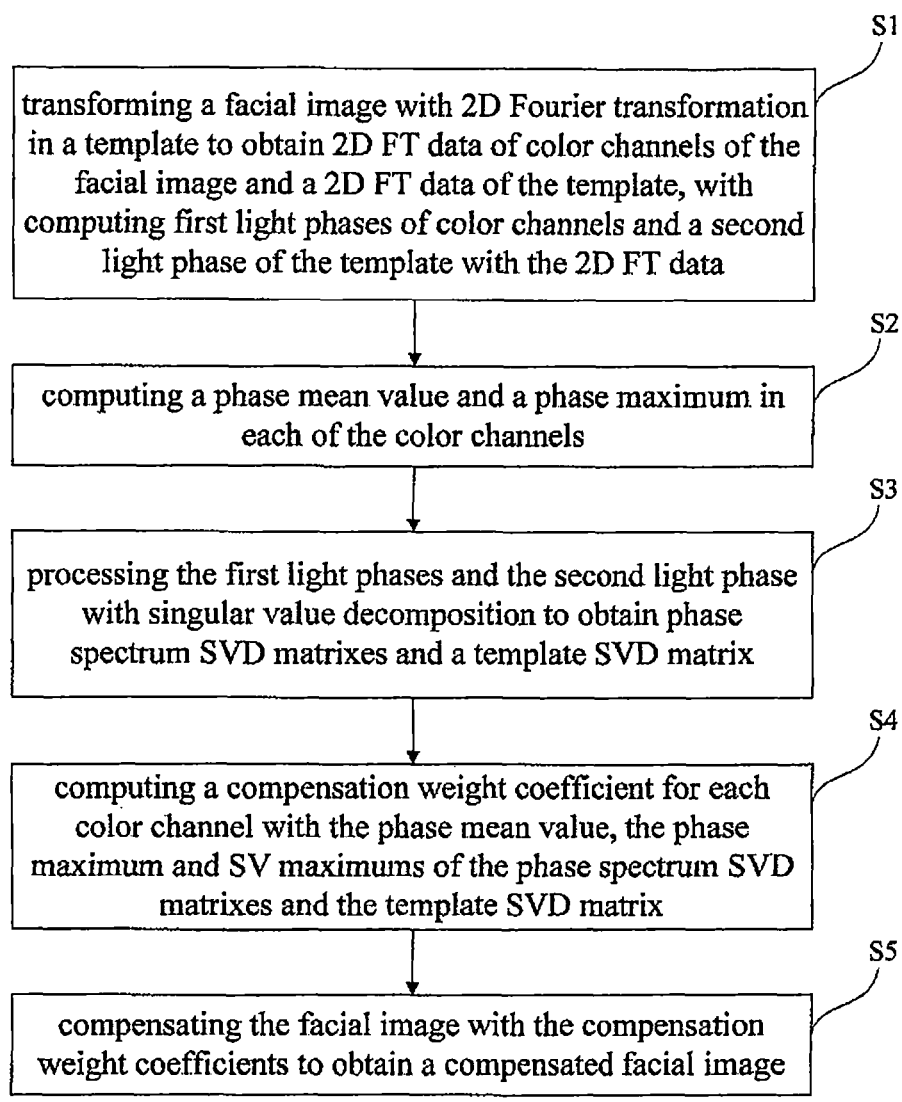
FIG. 1 is a flow chart of a facial image-processing method in accordance with a preferred embodiment of the present invention.
Figure 2:
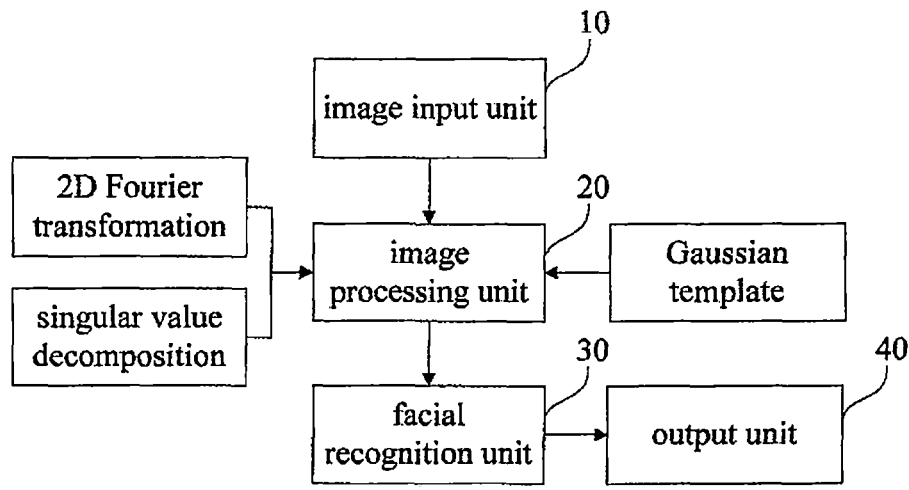
FIG. 2 is a block diagram of a facial image-processing system in accordance with a preferred embodiment of the present invention.

FIG. 1 shows a flow chart of a facial image-processing method in accordance with a preferred embodiment of the present invention. FIG. 2 shows a block diagram of a facial image-processing system, suitable for executing the method in FIG. 1, in accordance with a preferred embodiment of the present invention. Referring now to FIGS. 1 and 2, the facial image-processing system of the preferred embodiment of the present invention includes an image input unit 10, an image processing unit 20, a facial recognition unit 30 and an output unit 40. The image processing unit 20 connects with the image input unit 10, the facial recognition unit 30 connects with the image processing unit 20 and the output unit 40 connects with the facial recognition unit 30.

With continued reference to FIGS. 1 and 2, the image input unit 10 is selected from a digital camera device, an image-capturing device or other equivalent device. The image input unit 10 is provided to input at least one or a series of facial images (m×n images) or facial image pieces. The image input unit 10 further connects with a facial image database, including CMU-PIE database, FEI database or other equivalent facial database.

FIGS. 3A-3F show a series of facial images of a single face with various illumination modules collected from the CMU-PIE database for processing in the facial image-processing system in accordance with the preferred embodiment of the present invention. Referring to FIG. 3A-3F, prior to an image processing process, six samples of facial images with different illumination modules captured from the same person are selected.

Referring back to FIGS. 1 and 2, the facial image-processing method of the preferred embodiment of the present invention includes the step S1 of: transforming a facial image $f_A$, $A \in \{R, G, B\}$ with 2D Fourier transformation (FT) or 2D discrete Fourier transformation in a template to obtain a plurality of 2D FT data of color channels of the facial image and a 2D FT data of the template, with computing a plurality of first light intensities of color channels and a second light intensity of the template with the 2D FT data. The color channels include a R color channel, a G color channel and a B color channel.

With continued reference to FIGS. 1 and 2, the template is selected from a Gaussian template $G(\mu, \sigma)$ or other equivalent template. The 2D FT data $F_A(u, v)$ of color channels of the facial image and the 2D FT data $F_G(u, v)$ of the template are calculated by $$F_A(u, v) = R_A(u, v) + jI_A(u, v)$$

$$F_G(u, v) = R_G(u, v) + jI_G(u, v)$$

where $R_A$, $R_G$, $I_A$ and $I_G$ are real numbers and imaginary numbers of $F_A(u, v)$ and $F_G(u, v)$.

By way of example, the light intensities of color channels and the light intensity of the template are calculated by $$M_A(u, v) = \sqrt{R_A^2(u,v) + I_A^2(u,v)}$$

$$M_G(u, v) = \sqrt{R_G^2(u,v) + I_G^2(u,v)}$$

where $M_A(u, v)$ is a matrix of light intensity of the color channels and $M_G(u, v)$ is a matrix of light intensity of the template.

In another embodiment, a plurality of first light phases of color channels and a second light phase of the template are computed with the 2D FT data. By way of example, the first light phases and the second light phase are calculated by $$\phi_A(u, v) = \arctan\left[\frac{I_A(u, v)}{R_A(u, v)}\right]$$

where $\emptyset_A$, $A \in \{R, G, B\}$ is a matrix of light phase.

Still referring to FIGS. 1 and 2, the facial image-processing method of the preferred embodiment of the present invention includes the step S2 of: computing an intensity mean value and an intensity maximum in each of the color channels. By way of example, the intensity mean value and the intensity maximum in each color channel are calculated by $$m_A = \frac{1}{M \times N} \sum_{u=0}^{M-1} \sum_{v=0}^{N-1} M_A(u, v)$$

$$m = \max_{A \in \{R,G,B\}} (m_A)$$

where $m_A$ is a mean value of light intensity and m is a maximum value of light intensity.

Still referring to FIGS. 1 and 2, the facial image-processing method of the preferred embodiment of the present invention includes the step S3 of: processing the first light intensities of color channels and the second light intensity with singular value decomposition (SVD) to obtain a plurality of intensity spectrum SVD matrixes and a template SVD matrix. By way of example, the intensity spectrum SVD matrixes and the template SVD matrix are calculated by $$M_A = U_A \Sigma_A V_A^T$$

$$M_G = U_G \Sigma_G V_A^T$$

where $M_A$ is a SVD matrix of light intensity spectrum in each color channel and $M_G$ is a SVD matrix of template.

Still referring to FIGS. 1 and 2, the facial image-processing method of the preferred embodiment of the present invention includes the step S4 of: computing a compensation weight coefficient for each color channel with the intensity mean value, the intensity maximum and SV maximums of the intensity spectrum SVD matrixes and the template SVD matrix. By way of example, the compensation weight coefficients are calculated by $$\zeta_A = \sqrt{\frac{m}{m_A} \times \frac{\max(\Sigma_G)}{\max(\Sigma_A)}}$$

where $\xi_A$ is a compensation weight coefficient in each color channel, $\max(\Sigma_G)$ is a maximum of SVD matrix of the template and $\max(\Sigma_A)$ is a maximum of intensity spectrum SVD matrix in each color channel.

Still referring to FIGS. 1 and 2, the facial image-processing method of the preferred embodiment of the present invention includes the step S5 of: compensating the facial image with the compensation weight coefficients to obtain a compensated facial image to reduce a degree of lateral lighting affecting a human face in the facial image for recognition.

By way of example, a degree of light intensity for compensating the facial image with the compensation weight coefficients is calculated by $$M_{CA} = U_A (\xi_A \times \Sigma_A) V_A^T$$

$$R_{CA}(u, v) = M_{CA}(u, v) \times \cos(\emptyset_A(u, v))$$

$$I_{CA}(u, v) = M_{CA}(u, v) \times \sin(\emptyset_A(u, v))$$

$$F_{CA}(u, v) = R_{CA}(u, v) + jI_{CA}(u, v)$$

where $M_{CA}$ is a degree of light intensity for compensation, $F_{CA}$ is a compensation Fourier coefficient, $R_{CA}$ is a real number of $F_{CA}$ and $I_{CA}$ is an imaginary number of $F_{CA}$.

Referring again to FIGS. 1 and 2, the facial recognition unit 30 connects with the output unit 40 to output a recognition result of the compensated facial image. In a preferred embodiment, the image input unit 10 is selected from a digital video camera to capture a facial image which is a color facial image, a set of color facial image pieces or the like.

FIG. 4A shows an original, facial image and an original distribution chart of R, G, B color channels thereof selectively applied in the facial image-processing system in accordance with the preferred embodiment of the present invention. Correspondingly, FIG. 4B shows a first processed facial image and a first distribution chart of three color channels thereof processed from the original, facial image (as shown in FIG. 4A) by an adaptive SVD (ASVD) facial image-processing method.

FIG. 4C shows a second processed facial image and a second distribution chart of three color channels thereof processed from the original, facial image (as shown in FIG. 4A) by a ratio facial image-processing method with a ratio of $\max(\Sigma_G)/\max(\Sigma_A)$. In comparison with the first distribution chart of the first processed facial image, the second distribution chart of the second processed facial image is unchanged.

FIG. 4D shows a third processed facial image and a third distribution chart of three color channels thereof processed from the original, facial image (as shown in FIG. 4A) by another ratio facial image-processing method with a ratio of $m/m_A$. In comparison with the first and second distribution charts of the first and second processed facial images, the third distribution chart of the third processed facial image is slightly improved.

FIG. 4E shows a fourth processed facial image and a fourth distribution chart of three color channels thereof processed from the original, facial image (as shown in FIG. 4A) by the facial image-processing method of the present invention with the compensation weight coefficients $\xi_A$. In comparison with the first-third distribution charts of the first-third processed facial images, the fourth distribution chart of the fourth processed facial image is improved by eliminating defects in each color channel.

FIG. 4F shows a fifth processed facial image and a fifth distribution chart of three color channels thereof processed from the original, facial image (as shown in FIG. 4A) by the GASVDF (SVD and 2DFT) facial image-processing method of the present invention with the Gaussian template. In comparison with the first-fourth distribution charts of the first-fourth processed facial images, the fifth distribution chart of the fifth processed facial image is improved by linear adjustment in each color channel.

FIG. 5A shows a series of seven original, facial images with various lateral illumination modes, which are different modes of lateral illumination, applied in the facial image-processing system in accordance with the preferred embodiment of the present invention. Correspondingly, FIG. 5B shows a series of first processed facial images processed from the original, facial images (as shown in FIG. 5A) with various lateral illumination by the GASVDF facial image-processing method of the present invention.

FIG. 5C shows a series of second processed facial images processed from the original, facial images (as shown in FIG. 5A) by the RASVDF facial image-processing method of the present invention as a region-based partition method. Referring to FIG. 5C, the original, facial image (in FIG. 5A) is partitioned into four regions which is suitable for various lateral lighting on a single image and reducing data-processing time in recognition.

FIG. 5D shows a series of third processed facial images processed from the original, facial images (as shown in FIG. 5A) with various lateral illumination by the LASVDF facial image-processing method of the present invention as a block-to-block partition method. Referring to FIG. 5D, the original, facial image (in FIG. 5A) is partitioned into several image pieces which can avoid processing unnecessary image pieces for enhancing the quality of processed facial image. By way of example, the quality of the processed facial image includes clearness, nature and smoothness.

Figure 6:
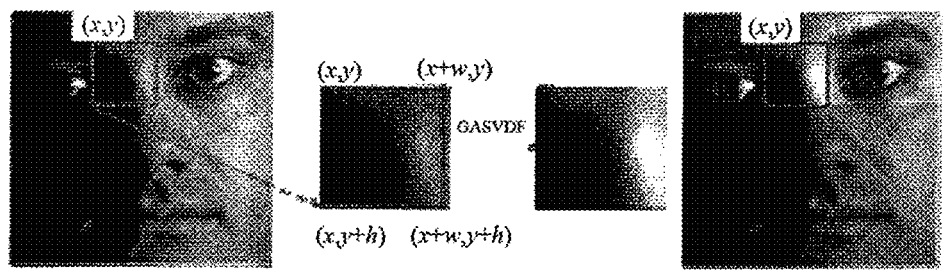
FIG. 6 is a flow of facial images partially block-to-block processed by the facial image-processing system in accordance with the preferred embodiment of the present invention.

FIG. 6 shows a flow of facial images partially block-to-block processed by the facial image-processing system in accordance with the preferred embodiment of the present invention. Referring to FIG. 6, an original image piece with coordinates (x, y) (shown in left portion of FIG. 6) is selected from the facial image and has a predetermined size of (w, h) (shown in left middle portion of FIG. 6). A processed image piece (shown in right middle portion of FIG. 6) is obtained from the original image piece and thus all of the processed image pieces are further combined to form a processed facial image (shown in right portion of FIG. 6).

Figures 7A, 7B, 7C, 7D:
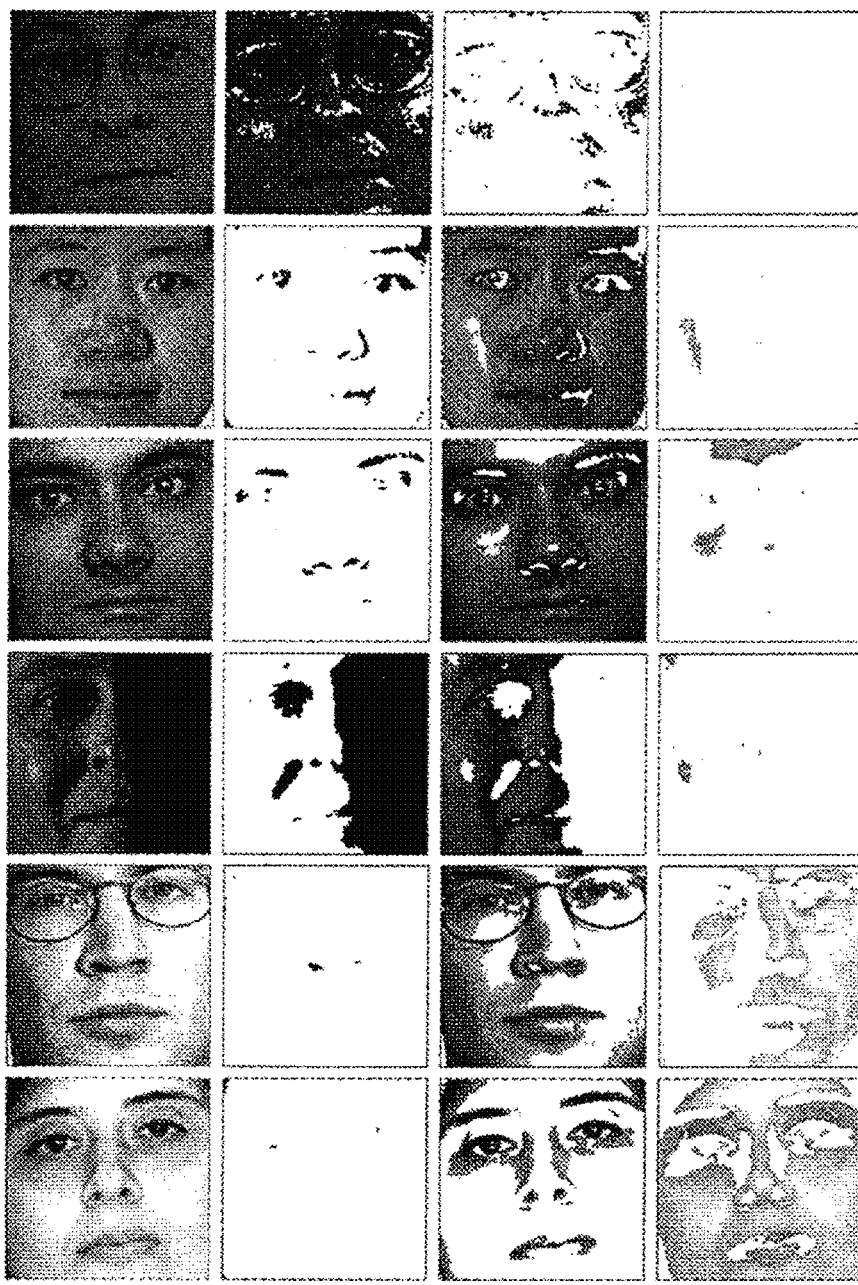
FIG. 7A is a series of processed facial images processed by the facial image-processing system in accordance with the preferred embodiment of the present invention.
FIGS. 7B-7D are three series of B-channel processed facial images with various brightness distributions processed by the facial image-processing system in accordance with the preferred embodiment of the present invention.

FIG. 7A shows a series of six processed facial images selectively processed by the facial image-processing system in accordance with the preferred embodiment of the present invention. With respect to the processed facial images in FIG. 7A, FIG. 7B shows a first series of processed facial images with a low brightness distribution in B color channel processed by the facial image-processing system in accordance with the preferred embodiment of the present invention. A pixel value of the low brightness distribution in B color channel ranges between 0 and 40.

FIG. 7C shows a second series of processed facial images with a medium brightness distribution in B color channel processed by the facial image-processing system in accordance with the preferred embodiment of the present invention. A pixel value of the medium brightness distribution in B color channel ranges between 40 and 210.

FIG. 7D shows a third series of processed facial images with a high brightness distribution in B color channel processed by the facial image-processing system in accordance with the preferred embodiment of the present invention. A pixel value of the high brightness distribution in B color channel ranges between 210 and 255.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A facial image-processing method comprising:
transforming a facial image with 2D Fourier transformation (FT) in a template to obtain a plurality of 2D FT data of color channels of the facial image and a 2D FT data of the template, with computing a plurality of first light intensities of color channels and a second light intensity of the template with the 2D FT data;
computing an intensity mean value and an intensity maximum in each of the color channels;
processing the first light intensities and the second light intensity with singular value decomposition (SVD) to obtain a plurality of intensity spectrum SVD matrixes and a template SVD matrix;
computing a compensation weight coefficient for each color channel with the intensity mean value, the intensity maximum and SV maximums of the intensity spectrum SVD matrixes and the template SVD matrix; and
compensating the facial image with the compensation weight coefficients to obtain a compensated facial image.

2. The method as defined in claim 1, wherein the template is selected from a Gaussian template.

3. The method as defined in claim 1, wherein the facial image is at least one or a plurality of facial feature image pieces which are combined to form a combined facial image.

4. The method as defined in claim 1, wherein the color channels include a R color channel, a G color channel and a B color channel.

5. The method as defined in claim 1, wherein the compensation weight coefficient is calculated with a ratio of the SV maximum of the template SVD matrix to that of the intensity spectrum SVD matrix.

6. A facial image-processing method comprising:
transforming a facial image with 2D Fourier transformation (FT) in a template to obtain a plurality of 2D FT data of color channels of the facial image and a 2D FT data of the template, with computing a plurality of first light phases of color channels and a second light phase of the template with the 2D FT data;
computing a phase mean value and a phase maximum in each of the color channels;
processing the first light phases and the second light phase with singular value decomposition (SVD) to obtain a plurality of phase spectrum SVD matrixes and a template SVD matrix;
computing a compensation weight coefficient for each color channel with the phase mean value, the phase maximum and SV maximums of the phase spectrum SVD matrixes and the template SVD matrix; and
compensating the facial image with the compensation weight coefficients to obtain a compensated facial image.

7. The method as defined in claim 6, wherein the template is selected from a Gaussian template.

8. The method as defined in claim 6, wherein the facial image is at least one or a plurality of facial feature image pieces which are combined to form a combined facial image.

9. The method as defined in claim 6, wherein the color channels include a R color channel, a G color channel and a B color channel.

10. The method as defined in claim 6, wherein the compensation weight coefficient is calculated with a ratio of the SV maximum of the template SVD matrix to that of the phase spectrum SVD matrix.

* * * * *